US010294420B2

(12) United States Patent
Luchinger et al.

(10) Patent No.: US 10,294,420 B2
(45) Date of Patent: May 21, 2019

(54) LUMINESCENT COMPONENT

(71) Applicant: AVANTAMA AG, Stafa (CH)

(72) Inventors: Norman Albert Luchinger, Meilen (CH); Ines Weber, Thalwil (CH); Stefan Loher, Zurich (CH); Marek Oszajca, Mannedorf (CH); Benjamin Hartmeier, Zurich (CH)

(73) Assignee: AVANTAMA AG, Stäfa (CH)

( * ) Notice: Subject to any disclaimer, the term of this patent is extended or adjusted under 35 U.S.C. 154(b) by 0 days.

(21) Appl. No.: 15/550,067

(22) PCT Filed: Dec. 15, 2016

(86) PCT No.: PCT/EP2016/081165
§ 371 (c)(1),
(2) Date: Aug. 10, 2017

(87) PCT Pub. No.: WO2017/108568
PCT Pub. Date: Jun. 29, 2017

(65) Prior Publication Data

US 2018/0273841 A1 Sep. 27, 2018

(30) Foreign Application Priority Data

Dec. 23, 2015 (EP) .................................... 15003668

(51) Int. Cl.
*C09K 11/02* (2006.01)
*G02F 1/1335* (2006.01)
(Continued)

(52) U.S. Cl.
CPC ............ *C09K 11/665* (2013.01); *C09K 11/02* (2013.01); *G02F 1/1336* (2013.01); *G02F 2001/133614* (2013.01)

(58) Field of Classification Search
None
See application file for complete search history.

(56) References Cited

U.S. PATENT DOCUMENTS 8,618,595 B2 * 12/2013 Korgel ................. A61B 5/0059 257/315
2012/0113672 A1 * 5/2012 Dubrow ................. B82Y 20/00 362/602

(Continued)

FOREIGN PATENT DOCUMENTS

WO 2014/113562 A1 7/2014
WO 2015/113562 A1 8/2015

OTHER PUBLICATIONS

International Search Report for corresponding International Application No. PCT/EP2016/081165 dated Feb. 22, 2017.

(Continued)

*Primary Examiner* — Ashok Patel
(74) *Attorney, Agent, or Firm* — Renner Otto Boisselle & Sklar

(57) ABSTRACT

A luminescent component comprises a first film comprising a first solid polymer composition and a second film comprising a second solid polymer composition. The first solid polymer composition comprises first luminescent crystals. The second solid polymer composition comprises second luminescent crystals. The first luminescent crystals are of size between 3 nm and 3000 nm, and emit red light in response to excitation by light with a shorter wavelength. The second luminescent crystals are of size between 3 nm and 3000 nm, and emit green light in response to excitation by light with a shorter wavelength. Said luminescent component is particularly suited for the application in LCD-backlight color conversion.

23 Claims, 2 Drawing Sheets

(51) Int. Cl.
*G02F 1/13357* (2006.01)
*C09K 11/66* (2006.01)

(56) References Cited

U.S. PATENT DOCUMENTS

| | | | | |
|---|---|---|---|---|
| 2014/0022779 | A1 | 1/2014 | Su et al. | |
| 2014/0340430 | A1 * | 11/2014 | Telfer | G09G 3/344<br>345/690 |
| 2015/0034875 | A1 | 2/2015 | Kwon et al. | |
| 2015/0075611 | A1 | 3/2015 | Inamura et al. | |
| 2015/0368553 | A1 | 12/2015 | Nelson et al. | |

OTHER PUBLICATIONS

Written Opinion of the International Searching Authority for corresponding International Application No. PCT/EP2016/081165 dated Feb. 22, 2017.
Protesescu et al., "Nanocrystals of Cesium Lead Halide Perovskites (CsPbX 3, X=Cl, Br, and I): Novel Optoelectronic Materials Showing Bright Emission with Wide Color Gamut", Nano Letters, vol. 15, No. 6, Jun. 10, 2015, pp. 3692-3696.
Extended European Search Report for corresponding European Application No. 15003668.9 dated Apr. 21, 2016.
Akkerman et al., "Tuning the Optical Properties of Cesium Lead Halide Perovskite Nanocrystals by Anion Exchange Reactions", Journal of the American Chemical Society, vol. 137, 2015, pp. 10276-10281.
Nedelcu et al., "Fast Anion-Exchange in Highly Luminescent Nanocrystals of Cesium Lead Halide Perovskites (CsPbX3, X=Cl, Br, I)", Nano Letters, vol. 15. No. 8, 2015, pp. A-F.

* cited by examiner

LUMINESCENT COMPONENT

This application is a national phase of International Application No. PCT/EP2016/081165 filed Dec. 15, 2016 and published in the English language, and claims priority to European Application No. 15003668.9 filed on Dec. 23, 2015.

TECHNICAL FIELD

The present invention relates to the field of luminescent crystals (LCs). The invention provides a luminescent component, a light emitting device, and a use of a luminescent component.

BACKGROUND ART

WO 2015/113562 A1 discloses a quantum dot film article with a first barrier film, a second barrier film, and a quantum dot layer separating the first barrier from the second barrier film. The quantum dot layer includes quantum dots dispersed in a polymer material. The polymer material includes a methacrylate polymer, an epoxy polymer and a photoinitiator. Different quantum dots can be dispersed in the common quantum dot layer. These quantum dots include Cadmium-Selenide (CdSe) or Indium-Phosphide (InP) material compositions.

DISCLOSURE OF THE INVENTION

According to an aspect of the present invention, a luminescent component is provided. The luminescent component comprises a first film and a second film. Preferably, a film is defined having at least one of a length and a width—and preferably both—exceeding a height/thickness of the film. It is preferred that the first and the second film do not spontaneously emit light but do so in response to excitation, and in particular in response to an excitation with light of a wavelength shorter than the wavelength of the light to be emitted in response to the excitation. Hence, in a preferred embodiment, the first film emits red light, preferably in response to an excitation with blue light, while the second film emits green light, preferably in response to an excitation with blue light. Red light is considered light with a peak wavelength in the range between 590 nm and 700 nm. Green light is considered light with a peak wavelength in a range between 490 nm and 570 nm.

For providing the subject light emitting properties, the first film comprises a first solid polymer composition including first luminescent crystals for emitting red light in response to an excitation. The second film comprises a second solid polymer composition including second luminescent crystals for emitting green light in response to an, and preferably the same excitation. Such different wavelength spectrum preferably is achieved by selecting a different chemical composition and/or a different size for the second luminescent crystals compared to the first luminescent crystals.

Suitable luminescent crystals are of the perovskite structure. Such perovskite structures are known per se and described as cubic, pseudocubic, tetragonal or orthorhombic crystals of general formula $M^1M^2X_3$, where $M^1$ are cations of coordination number 12 (cuboctaeder) and $M^2$ are cations of coordination number 6 (octaeder) and X are anions in cubic, pseudocubic, tetragonal or orthorhombic positions of the lattice. In these structures, selected cations or anions may be replaced by other ions (stochastic or regularly), still maintaining its crystalline structure. The manufacturing of such first and second luminescent crystals is known, e.g. from Protesescu et al. (Nano Lett., 2015, 15, 3692-3696).

Advantageously, the first luminescent crystals are selected from compounds of formula (I):

$$M^1_aM^2_bX_c \quad \text{(I), wherein}$$

$M^1$ represents Cs, $M^2$ represents Pb,

X independently represents anions selected from the group consisting of Cl, Br, I, cyanide and thiocyanate, a represents 1, b represents 1, c represents 3.

Independently means that X may be selected from one of the above named anions or may be a combination of more than one of the above anions. The term thiocyanate shall include both resonance structures, i.e. thiocyanate and isothiocyanate.

In embodiments of the invention, $M^1$ may be doped with up to 30 mol % of one or more other metals having coordination number 12 within the perovskite structure. Advantageously, $M^1$ is doped with up to 10 mol % of one or more of such metals. Suitable metals $M^1$ are selected from the group consisting of Rb, K, Na, and Li.

In embodiments of the invention, $M^2$ may be doped with up to 30 mol % of one or more other metals having coordination number 6 within the perovskite structure. Advantageously, $M^2$ is doped with up to 10 mol % of one or more of such metals. Suitable metals $M^2$ are selected from the group consisting of Ge, Sn, Sb and Bi.

In embodiments of the invention, X is selected from one of Cl, Br and I; or X represents independently two of Cl, Br and I; or X represents Cl, Br and I. The amount of Cl, Br, I, cyanide and thiocyanate may be determined by routine experiments such as MS or XRF, which are known in the field; the small Cl anion shifts the emission towards the blue, the large I anion towards the red and the medium sized Br anion towards the green part of the visible spectrum.

Advantageously, the first luminescent crystals are of formula (I-1)

$$CsPbI_xZ_{3-x} \quad \text{(I-1), wherein}$$

$1<x\leq 3$,

Cs, Pb is optionally doped with up to 30 mol % as described above,

Z represents one or more of Cl, Br.

Particularly advantageously, the first luminescent crystals are of formula $CsPbBr_xI_{3-x}$, where $0\leq x<2$ and/or of formula $CsPbCl_yBr_{3-y-z}I_z$, where $0<y<1$, $2\leq z\leq 3-y$.

Advantageously, the second luminescent crystals are selected from compounds of formula (II):

$$M^1_aM^2_bX_c \quad \text{(II), wherein}$$

$M^1$ represents Cs, $M^2$ represents Pb,

X independently represents anions selected from the group consisting of Cl, Br, I, cyanide and thiocyanate, a represents 1, b represents 1, c represents 3.

Again, independently means that X may be selected from one of the above named anions or may be a combination of more than one of the above anions. The term thiocyanate shall include both resonance structures, i.e. thiocyanate and isothiocyanate.

In embodiments of the invention, $M^1$ may be doped with up to 30 mol % of one or more other metals having coordination number 12 within the perovskite structure. Advantageously, $M^1$ is doped with up to 10 mol % of one or more of such metals. Suitable metals $M^1$ are selected from the group consisting of Rb, K, Na, and Li.

In embodiments of the invention, $M^2$ may be doped with up to 30 mol % of one or more other metals having coordination number 6 within the perovskite structure. Advantageously, $M^2$ is doped with up to 10 mol % of one or more of such metals. Suitable metals $M^2$ are selected from the group consisting of Ge, Sn, Sb and Bi.

In embodiments of the invention, X is selected from one of Cl, Br and I; or X represents independently two of Cl, Br and I; or X represents Cl, Br and I. The amount of Cl, Br, I, cyanide and thiocyanate may be determined by routine experiments; the small Cl anion shifts the emission towards the blue, the large I anion towards the red and the medium sized Br anion towards the green part of the visible spectrum.

The second luminescent crystals emit green light in response to excitation.

Advantageously, the second luminescent crystals are of formula (II-1)

$CsPbBr_xZ_{3-x}$ (II-1), wherein $2 \le x \le 3$,

Cs, Pb is optionally doped with up to 30 mol % as described above,

Z represents one or more of Cl, I.

Particularly advantageously, the second luminescent crystals are of formula $CsPbCl_yBr_zI_{3-y-z}$, where $0<y<1$, $1<z\le 3-y$, and/or of formula $CsPbBr_xI_{3-x}$, where $2 \le x \le 3$.

The first luminescent crystals are of size between 3 nm and 3000 nm, and in particular between 5 and 100 nm. The second luminescent crystals are of size between 3 nm and 3000 nm, and preferably between 5 and 100 nm.

Accordingly, cesium lead halide nanocrystals and/or doped cesium lead halide nanocrystals, which are of the perovskite structure, are preferably used as first and second luminescent crystals. The emission of light with a specific wavelength depends on a selection of the material of the luminescent crystals within the above constraints, and depends on a size of the luminescent crystals. Hence, the red light emitting property of the first luminescent crystals preferably is a result from the proper selection of the material at a defined size. The green luminescent crystals preferably have a different chemical composition and/or a different size.

In a very preferred embodiment, the first luminescent crystals designed for emitting red light are compounds of formula $CsPbBr_xI_{3-x}$ whereby $0 \le x<2$, or of formula $CsPbCl_yBr_{3-y-z}I_z$, where $0<y<1$, $2 \le z \le 3-y$, and show a peak wavelength in the range between 590 nm and 700 nm, preferably with an FMWH between 15 and 50 nm.

In a very preferred embodiment, the second luminescent crystals are designed for emitting green light are compounds of formula $CsPbCl_yBr_zI_{3-y-z}$, whereby $0 \le y \le 1$, $1<z \le 3-y$, or of formula $CsPbBr_xI_{3-x}$, whereby $2 \le x \le 3$, and show a peak wavelength in the range between 490 nm and 570 nm, preferably with an FMWH between 15 and 50 nm.

For both of the previous embodiments, a size of each of the first and second luminescent crystals is between 5 nm and 100 nm.

Preferably, the first film comprises first luminescent crystals only and is free from second luminescent crystals, while the second film comprises second luminescent crystals only and is free from first luminescent crystals. Preferably, the first film comprises first luminescent crystals only and is free from any other luminescent crystals, and the second film comprises second luminescent crystals only and is free from any other luminescent crystals. By these means, the first film is dedicated to solely emitting red light in response to an excitation, but no green light or light of a different color, respectively, while the second film is dedicated to solely emitting green light in response to an excitation, but no red light or light of a different color, respectively. This concept may hold for any first film in case of multiple first films, and for any second film in case of multiple second films, which multiple film concept will be introduced later on.

The present luminescent component provides for a spatial separation of the first and the second luminescent crystals. As will be shown in more detail below, the separation may be achieved by means of one or more of the substrate, a gap between the first and second film, and/or an arrangement of the first luminescent crystals in the dedicated first film only and an arrangement of the second luminescent crystals in the dedicated second film only. By doing so, an exchange of cations and anions between the first luminescent crystals and the second luminescent crystals is avoided. Given that the fabrication of the each of the films preferably is performed in a separate suspension, a mixing of first luminescent crystals and second luminescent crystals in a common suspension is avoided. Such mixing instead would result in a conversion of the origin first and second luminescent crystals into different luminescent crystals by way of reaction/recombination based on the above mentioned ion exchange. As a result, such different luminescent crystals would emit light of a different wavelength than the first or second luminescent crystals. Without being bound to theory, due to such an ion exchange reaction a resulting formulation of above red and green luminescent crystals would, depending on the effective compositions of the red and green particles emit a light with a wavelength between the original red and green emission peaks. Instead, the first and the second luminescent crystals are separated at the stage of manufacturing, and hence are added to different portions of the suspension resulting in the above first and second films after hardening/curing/drying.

By doing so, the luminescent crystals emitting green light (also referred to as green luminescent crystals) do not interact with luminescent crystals emitting red light (also referred to as red luminescent crystals). Each portion of the suspension preferably comprises the assigned luminescent crystals, a solvent, a ligand, and a polymer. Given that the resulting films are solid films, an interaction of the first luminescent crystals in the first film with the second luminescent crystals in the second film is avoided. In case of an adjacent arrangement of the first film and the second film, such interaction is avoided to a large extent, given that only cations/anions of the QDs residing at the interface of the first and the second film may recombine.

The present component provides an excellent photoluminescence quantum yield.

The term "quantum yield (QY)" is known in the field and relates to the amount of times a specific event occurs per photon that is absorbed in the system. In the context of the present invention the term "quantum yield" refers to the "photoluminescence quantum yield" of the described substance and both terms are used with identical meaning. The "photoluminescence quantum yield" defines how many photons of a higher wavelength (lower energy) are emitted by the described system per photon that is absorbed by the system.

For example, the quantum yield of the solid polymer compositions suggested to be used in the present films is in total >60%, and preferably >80%, most preferably >90%, preferably when excited by blue light. In addition, owed to the material selection, the crystal size, and the strict separation of the green and the red LCs, sharp wavelength distributions can be achieved in the emitted red and green light respectively, such that the quality of the resulting emitted light is superior. Preferably, the FWHM (Full Width at Half Maximum) of the solid polymer composition of each of the first film and the second film for visible emissions is <50 nm, preferably, <40 nm, and most preferably <30 nm, each in the range of red or green light respectively. For example, an FWMH for the emission peak at 507 nm of 22 nm can be observed, at the same time measuring a high luminescence quantum yield of e.g. 76%.

Embodiments of the present component comply with RoHS ("Restriction of Hazardous Substances") Directive by the European Union. At the time of the filing of the present patent application the applicable directive 2011/65/EU generally restricted the use of the following elements: Lead (Pb)<1000 ppm by weight, Mercury (Hg)<1000 ppm, Cadmium (Cd)<100 ppm, Hexavalent chromium (Cr6+)<1000 ppm, Polybrominated biphenyls (PBB)<1000 ppm, Polybrominated diphenyl ether (PBDE)<1000 ppm. On the one hand, this is achieved by selecting Cd-free material, which still provides excellent quantum yield/performance. The limit for Pb according to the RoHS Directive Version 2 (2011/65/EU) is 1000 ppm, which is achieved in the present embodiments on a per-film basis, and is achieved in total for the component as such. Preferably, the total Pb concentration for components according to any of the present embodiments is below 1000 ppm, more preferably in a range of 30 ppm and 1000 ppm, and most preferably between 100 ppm and 900 ppm. The RoHS compliance may be achieved by selecting an appropriate concentration of the first and second luminescent crystals in the first and second film respectively. The subject concentration can be measured by MS or XRF measurements.

Preferably, a concentration of the respective luminescent crystals with respect to a polymer matrix of the solid polymer composition per film is within a range of 0.01 wt % and 0.5 wt %, preferably between 0.05 wt % and 0.38 wt %, most preferably between 0.1 wt % and 0.35 wt % for the first film; and between 0.01 wt % and 0.40 wt %, preferably between 0.05 wt % and 0.31 wt %, most preferably between 0.1 wt % and 0.28 wt % for the second film. The upper limit of this concentration range supports RoHS compliance on the one hand, while the lower limit of this concentration range provides for a sufficient emission at reasonable film thicknesses of the component on the other hand.

Preferably, the thickness of the first film is between 3 μm and 500 μm, more preferably between 5 μm and 100 μm, most preferably between 10 μm and 30 μm and the thickness of the second film is between 30 μm and 500 μm, preferably between 50 μm and 200 μm, most preferably between 70 μm and 150 μm. The lower limit of the thickness range supports RoHS compliance on the one hand, while the upper limit of the thickness range provides for a limited material usage in the component on the other hand.

A concurrent high quantum yield, RoHS compliance, low material usage, a stable peak position and narrow FWHM in the emitted spectrum, a tunable emission spectrum and a high stability represents a major achievement of the present invention over the art. Conventionally, CdSe or InP materials were suggested for LCs. However, while the first provides a sufficient quantum yield, RoHS compliance is challenging and often relies on regulatory exemptions. The latter on the other hand is RoHS compliant but shows inferior optical qualities (quantum yield <60%; FWHM>40 nm). In contrast, the component of the present invention provides both, a good quantum yield, low peak FWHM and RoHS conformity. This is achieved by selecting appropriate materials for LCs, applying appropriate LC concentrations and film thicknesses and at the same time arranging the different LCs in different films, as a result separating the LCs from each other to avoid ion exchange reactions.

As to further specifying optical properties, it is preferred that either both of the first and the second film or the substrate have a haze between 10 and 90%. A haze may be introduced by scattering particles with RI>2.0 and size of 100-1000 nm, or by microstructures or microcrystalline polymer structures.

In a first embodiment, the first film and the second film are attached to each other. No substrate may be required in this embodiment. Barrier films may be attached to both outside surfaces of the stack of first and second film. The first film, the second film and the two barrier films preferably have the same plane extension, i.e. length and width.

Generally, one or more barrier films may be provided, preferably each barrier film having a water vapor transmission rate of less than 0.2 $(g*mm)/(m^2*day)$ at a temperature of 20-50° C./90% relative humidity and atmospheric pressure. In any of the above and below embodiments, the component may include a barrier film on top of an otherwise exposed surface of the first and/or second film. Such barrier film may in particular have a low water vapour transmission rate in order to avoid a degradation of the LCs in the film/s in response to being exposed to water. The barrier film may in one embodiment be permeable for $O_2$, or, in a different embodiment, may also be impermeable for oxygen. Preferably, the barrier film is transmissive for light. Such barrier film may be present in the form of a single layer or in the form of multilayers. The barrier film comprises organic polymers and/or inorganic materials. Suitable organic polymers may be selected from the group consisting of polyvinylidene chlorides (PVdC), cyclic olefin copolymer (COC), high-density polyethylene (HDPE); suitable inorganic materials may be selected from the group consisting of metal oxides, $SiO_x$, $Si_xN_y$. Most preferably, a polymer barrier film comprises materials selected from the group of PVdC and COC.

In case of complex barrier film architectures, such as organic/inorganic multilayers, the water vapor transmission rate of a barrier film is calculated by the water vapor transmission rate given in $g/(m^2*day)$ multiplied by the thickness of the barrier film given in mm. For example, a multilayer barrier film with 0.1 $g/(m^2*day)$ and a thickness of 0.1 mm will result in a calculated water vapor transmission rate of 0.01 $(g*mm)/(m^2*day)$.

In a preferred embodiment, the water vapor transmission rate of the barrier film given in the unit "$g/(m^2*day)$" is less than 1.0 $g/(m^2*day)$, preferably less than 0.1 $g/(m^2*day)$.

Preferably, a substrate is provided for supporting the first and the second film. The substrate may be a polymer substrate, such as a polyethylenterephthalat substrate or an inorganic material such as glass. Preferably the substrate is selected from the list of polyethylenetherephtalate (PET), triacetylcellulose (TAC), polyethylene naphtalate (PEN). Preferably, the substrate is transmissive for light in the visible spectrum, i.e. the substrate is non-opaque. In one embodiment, the first film and the second film are both attached to the substrate, and hence, except for a possible bonding or other attachment layer in between, are in direct contact with the substrate. In a different embodiment, one or both of the first film and the second film may not be in direct contact with the substrate but may be attached to another layer or film which in turn is attached to the substrate. In such arrangement the one or more films are still considered to be supported by the substrate. Such support results in a component, that may be easy to further assemble or that may be robust enough for further handling. The substrate preferably is a sheet-like structure, preferably of a length and a width both exceeding a height/thickness of the substrate, and preferably both exceeding its thickness at least ten times. In a preferred embodiment, the thickness of the substrate is in a range between 30 μm and 300 μm, and preferably is between 50 μm and 150 μm. In one embodiment, the substrate may also act as a barrier film such that an exposed surface of the substrate may not necessarily be covered by a dedicated barrier film. In a different embodiment, however, and in particular when the substrate is transmissive to water, an otherwise exposed surface of the substrate may also be covered by a barrier film.

The term "film" does not necessarily imply that its plane extension defined by its length and width is equal to the plane extension of the substrate defined by its length and width. Each of the first and the second film may in particular show a smaller plane extension than the substrate. However, in another embodiment, each of the first and the second film shows a plane extension equal to the plane extension of the substrate.

In a preferred embodiment, one or more of the first and the second film may comprise scatter particles, such as TiO2.

In a preferred class of embodiments, the substrate, the first film and the second film are vertically stacked, i.e. orthogonal to their plane extensions.

In a first embodiment of this class, the substrate is arranged between the first film and the second film. Hence, the first and the second films are separated by the substrate. In a preferred variant, the first film is deposited directly on a first surface of the substrate, e.g. its bottom surface, while the second film is directly deposited on a second surface of the substrate, e.g. its top surface. In a different variant, one or more intermediate layers, in particular of light transmissive property, may be arranged between one or both of the films and the substrate. Any deposition/attachment of the first or second film on the substrate or on each other—the latter will be explained below—may include coating, depositing, laminating, bonding, etc. Preferably, a first of the barrier films is deposited on the surface of the first film otherwise exposed, and a second of the barrier films is deposited on the surface of the second film otherwise exposed.

In a different approach, one of the films is arranged between the substrate and the other film. In a first embodiment, the first film is arranged between the substrate and the second film. In a second embodiment, the second film is arranged between the substrate and the first film. In a preferred variant, one of the films is deposited directly on a surface of the substrate, e.g. its top surface, while the other film is directly deposited on the one film. In a different variant, one or more intermediate layers, in particular of light transmissive property, may be arranged between the one film and the substrate, and/or between the one film and the other film. Preferably, the otherwise exposed surface of the first or second film may be covered by a barrier film. In one embodiment, the otherwise exposed surface of the substrate may also be covered by another barrier film.

In all of the above embodiments, it is preferred that the planar extension of the substrate, the first and the second film, and the one or more barrier films if any, is the same. In this respect, the luminescent component may also be considered as a layered structure, a film made from multiple individual films, a foil, etc. In case of the luminescent component serving as a backlight for a liquid crystal display, such rectangular component may have a planar extension with a diagonal of more than 3 inches, e.g. for displays of handhelds, or preferably with a diagonal of more than 15 inches for computer displays or TVs. Although the above requires a rectangular plane extension of each of the substrate if any, the first film and the second film, it is emphasized that the scope is not limited to rectangular components. A component may also take a different basic shape, such as a shape of a circle, an ellipse, etc.

In a different class of embodiments, the substrate, the first film and the second film are not all vertically stacked, but the first film and the second film are preferably arranged on the same vertical level, i.e. they are arranged next to each other laterally in the plane of extension of the component. Preferably, both the first film and the second film are arranged on a common surface of the substrate, e.g. its top surface. In a different variant, one or more intermediate layers, in particular of light transmissive property, may be arranged between the substrate and each of the first and the second film. It is noted that the size of each individual piece of the first or second film preferably is below a size that is detectable by eye in the final application (comparable to the pixel size in LCD screens).

In one embodiment thereof, the first film and the second film are arranged spaced. Hence, a gap is provided laterally between the first film and the second film. The gap may be filled by air or a different gas, or may be filled by a solid such as a polymer. Hence, the first and the second film are separated from each other, thereby not allowing any recombination between the first luminescent crystals and the second luminescent crystals.

In an alternative embodiment, the first film and the second film are arranged adjacent. Here, the first film and the second film are in contact with each other, and in particular are in contact at their side surfaces.

Any of above embodiments of the component, and in particular of the embodiments of the second class are not limited to a single first film and a single second film. It may be preferred, that multiple first films comprising the first solid polymer composition and multiple second films comprising the second solid polymer composition are arranged on the same level. It may be preferred that the multiple first films and the multiple second films are arranged alternating on substrate in one of a spaced or an adjacent arrangement. In one embodiment, each of the first and second film may take the shape of a stripe having a length equal to the length of the substrate, and a width less than the width of the substrate, and preferably less than a tenth of the width of the substrate and most preferably less than 1 mm, such that multiple first film stripes and second film stripes can be arranged in alternating fashion on the substrate. In a different embodiment, the multiple first and second films may be arranged in form of a two dimensional array on the substrate. For example, the substrate may be covered by alternating first film type rectangles/circles and second film type rectangles/circles, either in spaced relation, or in contact. Any such arrangement may in particular be beneficial when the plane extension of the component is rather large, e.g. when the component is supposed to be used in a display, since in terms of the generation of white background light it may be preferred not to generate red light only at one end of the underlying substrate and green light on the other end, but intermingle red and green light sources represented by the corresponding films.

Any of the embodiments of the second class may include a barrier film covering the otherwise exposed surfaces of the first and second films. In addition, the otherwise exposed surface of the substrate may be covered by another barrier film.

The luminescent component preferably is an intermediate good that is assembled together with other components into a device, such as an optical device, and preferably into one of a Liquid Crystal Display (LCD), an Organic Light Emitting Diode (OLED), a Light Emitting Diode (LED). As part of an OLED, LED or LCD, the component may contribute to a display of a mobile or stationary computing, telecommunication, or television device.

In a preferred embodiment, the device represents a backlight film for a liquid crystal display for emitting white light. For this purpose, a blue light source may be provided in the device for exciting luminescent reactions in the first and the second film. In case the substrate is of light transmissive property for light in the visible spectrum, the luminescent component emits white light resulting as a combination of the emission of red and green light in response to an excitation of the luminescent crystals in the first and second film respectively, and from the transmission of the blue light stemming from the light source which blue light is also used to excite the first and the second film. An intensity proportion of the red, green and blue light emitted preferably is in the range of a ⅓ each.

In this context, the luminescent component may be used as a backlight film for a liquid crystal display, according to another aspect of the present invention.

Luminescent crystals (LC) preferably are made from semiconductor materials. A luminescent crystal shall include a quantum dot, typically in the range of 3-12 nm and a nanocrystal of up to 100 nm and a luminescent crystal of up to 3 μm. Preferably, luminescent crystals are approximately isometric (such as spherical or cubic). Particles are considered approximately isometric, in case the aspect ratio (longest:shortest direction) of all 3 orthogonal dimensions is 1-2. LCs show, as the term indicates, luminescence or more specifically defined photoluminescence. In the context of the present invention a luminescent crystal typically is a single-crystalline particle spatially separated from other particles due to the presence of a surfactant. It is a semiconducting material which exhibits a direct bandgap (typically in the range 1.1-3.8 eV, more typically 1.4-3.5 eV, even more typically 1.7-3.2 eV). Upon excitation/illumination with electromagnetic radiation equal or higher than the bandgap, the valence band electron is excited to the conduction band leaving an electron hole in the valence band. The formed exciton (electron-electron hole pair) then radiatively recombines in the form of photoluminescence, with maximum intensity centered around the LC bandgap value and exhibiting photoluminescence quantum yield of at least 1%. In contact with external electron and electron hole sources LC could exhibit electroluminescence. In the context of the present invention LCs do not exhibit mechano-luminescence (e.g. piezoluminescence), chemiluminescence, electrochemiluminescence nor thermoluminescence.

A quantum dot (QD) particularly relates to a semiconductor nanocrystal, which has a diameter typically between 3-12 nm. In this range, the physical diameter of the QD is smaller than the bulk excitation Bohr radius, causing quantum confinement effect to predominate. As a result, the electronic states of the QD, and therefore the bandgap, are a function of the QD composition and physical size, i.e. the color of absorption/emission is linked with the QD size. The optical quality of the QDs sample is directly linked with their homogeneity (more monodisperse QDs will have smaller FWHM of the emission). When QD reach size bigger than the Bohr radius the quantum confinement effect is hindered and the sample may not be luminescent anymore as nonradiative pathways for exciton recombination may become dominant. Thus, QDs are a specific sub-group of nanocrystals, defined in particular by its size and size distribution. Properties of the QDs are directly linked with these parameters, distinguishing them from nanocrystals.

Each of the first and the second solid polymer compositions preferably comprise in addition to the luminescent crystals of the respective type, a hardened, cured or dried polymer, preferably of the same type in both the first solid polymer composition and the second solid polymer composition, including an organic and/or an inorganic synthetic materials. Preferably, the polymer is selected from the group of acrylate polymers (including co-polymers), carbonate polymers, sulfone polymers, epoxy polymers, vinyl polymers, urethane polymers, ester polymers, olefin polymers, cyclic olefin copolymers, styrene polymers and silicone polymers. Most preferably the polymer is selected from the list of acrylate polymers (including co-polymers), polystyrene, silicones and cyclic olefin copolymers. Furthermore the polymer can be linear or cross-linked.

In a preferred embodiment when the first film is in direct contact with the second film the polymer of the first film differs from the polymer of the second film in order to avoid potential intermixing of the first film with the second film.

The hardened/cured polymer preferably is light transmissive, i.e. non-opaque for allowing light emitted by the luminescent crystals, and possible light of a light source used for exciting the luminescent crystals to pass.

Preferably, and in addition to the hardened/cured polymer and the luminescent crystals of the respective type, one or more of the first and second polymer compositions comprises a surfactant selected from the group of non-ionic, anionic, cationic and zwitter-ionic surfactants; preferably selected from the group of amine or carboxy terminated surfactants.

The terms "surfactant", "ligand", "dispersant" and "dispersing agent" are known in the field and have essentially the same meaning. In the context of the present invention, these terms denote an organic substance, other than a solvent, which is used in suspensions or colloids to improve the separation of particles and to prevent agglomeration or settling. Without being bound to theory, it is believed that surfactants are physically or chemically attached on the particle surface either before or after adding the particles to the solvent and thereby provide the desired effects. The term surfactants includes polymer materials and small molecules; surfactants typically contain polar end-groups and apolar end-groups. In the context of the present invention, solvents (e.g. toluene) are not considered surfactants.

A "suspension" as used above in the aspect related to manufacturing is known and relates to a heterogeneous fluid of an internal phase (i.p.) that is a solid and an external phase (e.p.) that is a liquid. The external phase comprises one or more dispersants/surfactants, optionally one or more solvents and optionally one or more pre-polymers or dissolved polymers. Accordingly, each type of luminescent crystal (first, second) is added to the dedicated portion of suspension. Further processing includes the application of one or each portion of suspension to the desired area on the substrate. This step is also referred to as solution processing which denotes the application of a coating or thin film to a substrate by the use of a solution-based (=liquid) starting material. This is considered a significant advantage, as it enables manufacturing of all films by simple technologies applicable to large areas and continuous processing.

Preferably, the first and second luminescent crystals each are embedded in a matrix such as a polymer matrix or an inorganic matrix, in order to spatially separate the first LCs from each other in the first film, and the second LCs from each other in the second film. The resulting "LC/QD composite" denotes a solid inorganic/organic composite material comprising LCs/QD, surfactant and a matrix and contributes to the respective first or second film.

Other advantageous embodiments are listed in the dependent claims as well as in the description below.

BRIEF DESCRIPTION OF THE DRAWINGS

Embodiments, examples, experiments representing or leading to embodiments, aspects and advantages of the invention will be better understood from the following detailed description thereof. Such description makes reference to the annexed drawings, wherein.

DETAILED DESCRIPTION OF THE DRAWINGS

Figure 1:
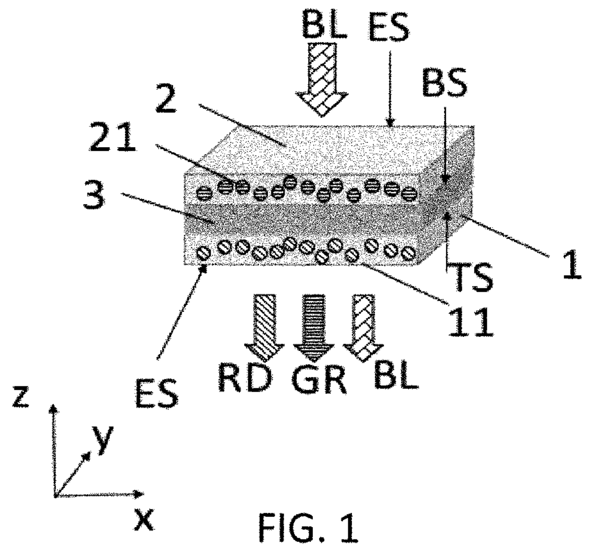
FIGS. 1 to 4 each shows a perspective view of a luminescent component according to an embodiment of the present invention.

FIG. 1 illustrates a perspective view of a luminescent component according to an embodiment of the present invention. The luminescent component comprises a substrate 3, e.g. made from a non-opaque polymer or a non-opaque inorganic material such as glass. The substrate has a top surface TS and a bottom surface BS opposite the top surface TS.

A first film 1 is attached to the top surface TS of the substrate 3. A second film 2 is attached to the bottom surface BS of the substrate 3. The attachment may be achieved e.g. by bonding or by directly casting the respective film onto the substrate. Each of the first film 1, second film 2 and substrate 3 has a length along the x-axis, a width along the y-axis, and a thickness along the z-axis.

The following description of characteristics of the first and the second film 1, 2 are applicable to all other embodiments introduced in this section.

The first film 1 comprises a first solid polymer composition. The first solid polymer composition at least comprises a first polymer and first luminescent crystals 11, wherein the first luminescent crystals 11 are selected from compounds of formula (I) as defined herein.

The first luminescent crystals 11 have a size between 3 nm and 3000 nm. In response to excitation, the first luminescent crystals 11 emit red light.

The second film 2 comprises a second solid polymer composition. The second solid polymer composition comprises at least a second polymer and second luminescent crystals 21. The second luminescent crystals 21 are selected from compounds of formula (II) as defined herein.

The second luminescent crystals 21 have a size between 3 nm and 3000 nm. In response to excitation, the second luminescent crystals 21 emit green light.

First and second polymer preferably but not necessarily are the same.

As can be derived from FIG. 1, it is preferred that both the first and the second film 1, 2 extend all across the top and respective bottom surface TS, BS of the substrate 3. Hence, the footprint of the substrate 3 can fully be exploited.

The first luminescent crystals 11 and the second luminescent crystals 21 are separated from each other. In this embodiment, the substrate 3 builds the separation. Hence, the first and second films 1, 2 are stable, also in a long-term. It is preferred—which feature is also true for any of the other embodiments—that the first film 1 exclusively comprises the first luminescent crystals 11 emitting red light when excited, such that preferably there are no second luminescent crystals 21 present in the first film 1, nor any other than the first luminescent crystals 11. Accordingly, it is preferred,—which feature is also true for any of the other embodiments—that the second film 2 exclusively comprises the second luminescent crystals 21 emitting green light when excited, such that preferably there are no first luminescent crystals 11 present in the second film 2, nor any other than the second luminescent crystals 21.

As is indicated in FIG. 1, once such luminescent component is exposed to radiation, and in particular to blue radiation BL, the first and second luminescent crystals 11 and 21 are excited and emit red and green light RD, GR respectively. Together with a portion of the blue light BL passing the luminescent component the output of the luminescent component is white light. Hence, the present device can preferably be used as a backlight illumination in an LCD, for example.

Figure 2:
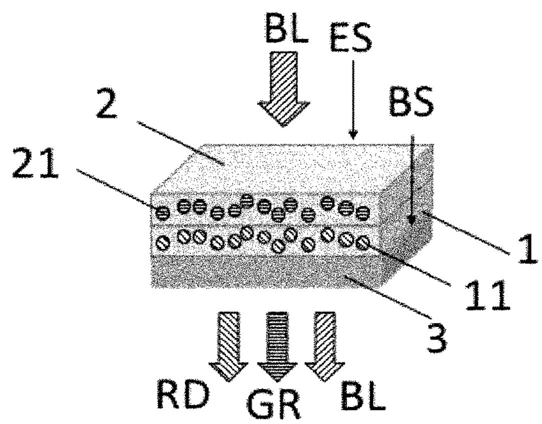

FIG. 2 illustrates a perspective view of a luminescent component according to another embodiment of the present invention. Again, the luminescent component comprises a substrate 3 and a first and a second film 1, 2. The first film 1 preferably comprises first luminescent crystals 11 only while the second film 2 preferably comprises second luminescent crystals 21 only. Again, the first and the second films 1 and 2 fully extend across a surface of the substrate 3. In contrast to FIG. 1, however, the first and the second films 1 and 2 are not arranged on different sides of the substrate 3, but are arranged at the same side of the substrate 3 on top of each other. Hence, a stack built from the first and the second luminescent film 1 and 2 is deposited on a surface of the substrate 3, e.g. the bottom surface BS. This stack may also be divided by a layer of a different polymer composition. In the example shown in FIG. 2, the first luminescent film 1 is attached to the bottom surface BS of the substrate 3, while the second luminescent film 2 is arranged on bottom of the exposed surface of the first film 1. In a different arrangement, the second luminescent film 2 is attached to the bottom surface BS of the substrate 3 while the first luminescent film 1 is attached to the exposed surface of the second luminescent film 2. Of course, when it comes to manufacturing the luminescent component, the films may be attached in sequence to the substrate 3. In a different embodiment, the first and the second luminescent films 1, 2 are attached to each other forming a stack prior to attaching the stack to the substrate 3.

Figure 3:
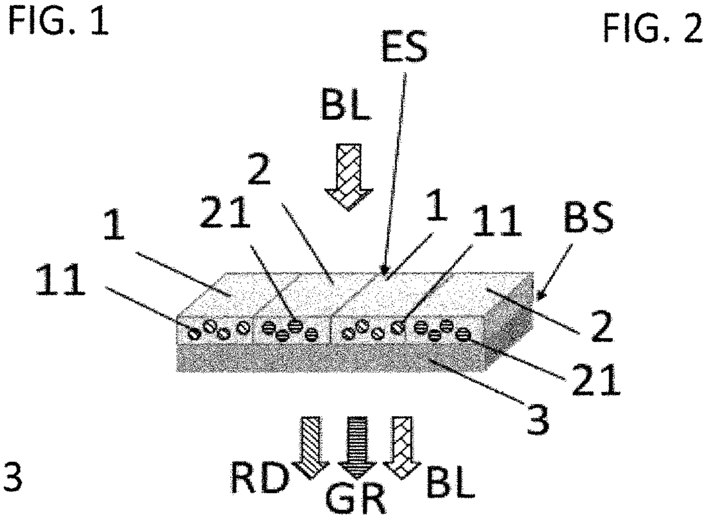
Figure 4:
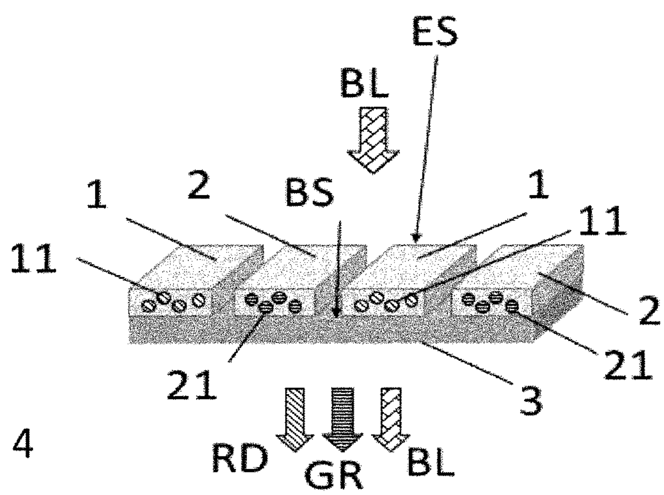

FIGS. 3 and 4 illustrate perspective views of luminescent components according to further embodiments of the present invention. Instead of providing only a single first film 1 and a single second film 2 such as in the embodiments of FIGS. 1 and 2, multiple first films 1 and multiple second films 2 are provided, wherein the number of two films per type is only exemplary. Instead of arranging the first and second luminescent films 1, 2 on different levels, i.e. on different vertical (z–) positions such as in the embodiments of FIGS. 1 and 2, the luminescent films 1 and 2 are arranged in the same level on the z-axis. Hence, the first and the second luminescent films 1 and 2 are arranged next to each other in the same plane, and, as a result, the first and the second film 1, 2 are both arranged on a common surface of the substrate 3, e.g. its bottom surface BS. In the embodiment of FIG. 3, the first and second films 1 and 2 are arranged alternating and in contact with each other, while in the embodiment of FIG. 4, the first and second films 1 and 2 are arranged alternating and separated from each other by air gaps. It is noted that the spatial arrangement preferably is in such a small size that it is not visible by eye in the final application.

Figure 5:
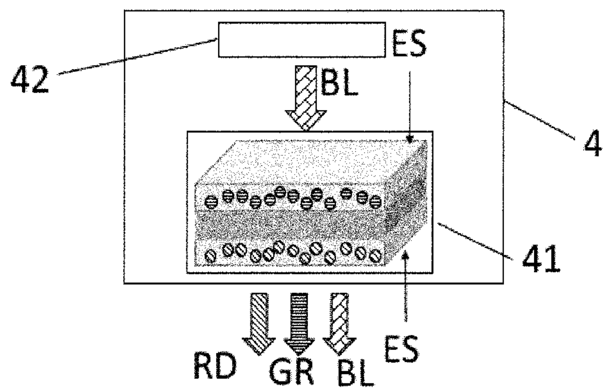
FIG. 5 illustrates a schematic block diagram of a light emitting device according to an embodiment of the present invention.

FIG. 5 illustrates a schematic block diagram of a light emitting device according to an embodiment of the present invention. The device 4 includes a luminescent component 41 according to FIG. 1, and a light source 42 for emitting blue light, the light source 42 being arranged such that the emitted blue light excites the luminescent component 41. Preferably, the light source 42 is embodied as an element of the same length and width as the first and second film 1,2, and is attached to the luminescent component 41.

In any of the embodiments of the luminescent components of FIGS. 1 to 5, otherwise exposed surfaces ES of the first or second film 1 or 2 are preferably covered by a barrier film for protecting the luminescent crystals in the respective films 1 and 2. Preferably, such one or two barrier films fully extend across the otherwise exposed surface, but not necessarily across side surfaces of the first or second films 1, 2 represented by the thickness of the subject films 1, 2, along the z-direction.

EXAMPLES AND EXPERIMENTS

Example 1

Green emitting luminescent crystals (LCs) with nominal composition CsPbBr3 were synthesized according to literature procedure presented by Protesescu et al. (Nano Lett., 2015, 15, 3692-3696). The LCs concentration was determined to be 0.54 wt % by heating up the dispersion to 450° C., which led to evaporation of the solvent and burning away the ligands. The dispersion was optically characterized with a Quantaurus C11347-11 device (equipped with an integrating sphere, Hamamatsu). The LCs dispersion, excited at 450 nm, had a photoluminescence peak centered at 500 nm with a FWHM of 23 nm and a photoluminescence quantum yield of 89%.

12.4 wt % of this formulation were mixed with 87.3 wt % of 30 wt % PMMA (Plexiglas 7N) solution in toluene and 0.3 wt % TiO2 scatter particles (Kronos 2800) and directly poured onto a glass substrate preheated to 60° C. The excess of the mixture was removed with a doctor blade (Zehntner ZAA2300), and after 4 h 60° C. drying resulting in a 100 μm thick film, measured with a micrometer (Mitutoyo 1265). Upon excitation with 450 nm light the film exhibited photoluminescence with a peak centered at 507 nm with a FWHM of 22 nm and a photoluminescence quantum yield of 76%. The dry film had a calculated Pb concentration of approximately 900 ppm.

Example 2

Red emitting LCs with nominal composition CsPbBr3 were synthesized according to literature procedure presented by Protesescu et al. (Nano Lett., 2015, 15, 3692-3696). The LCs concentration was determined to be 0.06% by heating up the dispersion to 450° C., which led to evaporation of the solvent and burning away the ligands. The dispersion was optically characterized with a Quantaurus C11347-11 device (equipped with an integration sphere, Hamamatsu). The LCs dispersion, excited at 450 nm, had a photoluminescence peak centered at 638 nm with a FWHM of 33 nm and a photoluminescence quantum yield of 72%.

18.4 wt % of this formulation were mixed with 81.3 wt % of 30 wt % PMMA (Plexiglas 7N) solution in toluene and 0.3 wt % $TiO_2$ scatter particles (Kronos 2800) and directly poured onto a glass substrate preheated to 60° C. The excess of the mixture was removed with a doctor blade (Zehntner ZAA2300), and after 4 h 60° C. drying resulting in a 50 μm thick film, measured with a micrometer (Mitutoyo IP65). Upon excitation with 450 nm light the film exhibited photoluminescence with a peak centered at 641 nm with a FWHM of 31 nm and a photoluminescence quantum yield of 70%. The dry film had a calculated Pb concentration of approximately 130 ppm.

Example 3

Figure 6:
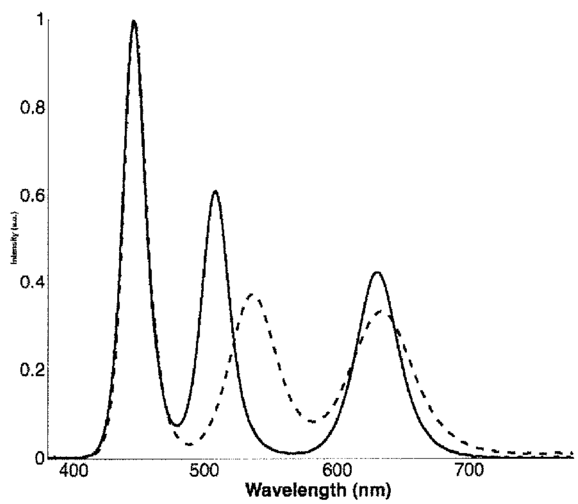
FIG. 6 illustrates an emission spectrum of a device according to an embodiment of the present invention.

Both green and red emitting formulations described in Examples 1 and 2, respectively, were coated on opposite sides of a 100 μm thick PET foil following the same protocols. The resulting double-side coated PET foil was 250 μm thick, measured with a micrometer (Mitutoyo IP65), composed of a 100 μm green emitting film, a 100 μm PET foil, and a 50 μm red emitting film. Upon excitation with 450 nm light the film exhibited photoluminescence with two peaks centered at 507 and 636 nm with a FWHM of 22 and 33 nm, respectively and a total photoluminescence quantum yield of 70%, as measured with the same device as in Example 1. This foil was then used as the backlight film of the Samsung SUHD TV (Model UE48JS8580T) including the prism sheet and the diffusor but without the presence of the LCD unit. The quality of the passing light was measured with a UPRTek MK350N+ spectroradiometer resulting in 1:0.76:0.78 blue:green:red peak integral ratio, as indicated by the straight line in FIG. 6. FIG. 6 presents also conventional peak positions by a dashed line, e.g. of the original Samsung backlight film. The integral ratio in the Samsung film values 1:0.74:0.84 blue:green:red. Upon excitation with 450 nm light the Samsung film exhibited photoluminescence with two peaks centered at 530 and 630 nm with a FWHM of 40 and 50 nm, respectively and a total photoluminescence quantum yield of 56%, as measured with the same device as in Example 1.

Experiment 4 (comparative experiment): The green and red emitting formulations described in Examples 1 and 2, respectively, were mixed together at dry LC weight ratios of red LCs:green LCs=1:1 (9:1 in formulation weight). Without being bound to theory, due to the ion exchange reaction the resulting formulation became orange with a low yellow luminescence. The formulation was measured in the same instrument as Example 1 and showed the following optical properties: Quantum yield 9.5%, emission peak wavelength 554 nm, FWHM 28 nm. When coated on a 100 μm PET foil following the same protocol as in Examples 1-2 they demonstrated similar optical properties as in the liquid mixture.

This experiment clearly demonstrates that red and green LC's cannot be combined in the same liquid formulations nor in the same polymer matrix without substantially affecting the optical properties.

Example 5

20 wt % COC (Cyclic olefin copolymer, TOPAS 8007) in toluene was poured onto a glass substrate preheated to 60°

C. The excess of the mixture was removed with a doctor blade (Zehntner ZAA2300), and after 2 h 60° C. drying resulting in a 25 μm thick film measured with a micrometer (Mitutoyo IP65). This film was subsequently overcoated with the LC-PMMA formulation from Experiment 2 and dried at 60° C. for 4 hours. Finally, the stack was coated again with 20 wt % COC (TOPAS 8007) in toluene. The excess of the mixture was removed with a doctor blade and the film was dried for 2 h at 60° C. Upon excitation with 450 nm light the film exhibited photoluminescence with a peak centered at 641 nm with a FWHM of 31 nm and photoluminescence quantum yield of 70%, as measured with the same device as in Experiment 1.

The stack was then placed in a 60° C. thermostat containing a moisture generator keeping the relative humidity at approximately 90%. After 72 h the stack retained the same quantum yield of 70%. In a reference measurement, where only LC-PMMA film (without COC) was placed in the thermostat, no photoluminescence (quantum yield <1%) was found after 72 h.

The invention claimed is:

1. A luminescent component, comprising a first film comprising a first solid polymer composition, wherein the first solid polymer composition comprises first luminescent crystals, wherein the first luminescent crystals are of the perovskite structure, are selected from compounds of formula (I):

$$M^1_aM^2_bX_c \quad \text{(I), wherein}$$

$M^1$ represents Cs, or Cs doped with up to 30 mol % of one or more other metals having coordination number 12, $M^2$ represents Pb, or Pb doped with up to 30 mol % of one or more other metals having coordination number 6, X independently represents anions selected from the group consisting of CI, Br, I, cyanide, and thiocyanate, a represents 1, b represents 1, c represents 3;

are of size between 3 nm and 3000 nm, emit red light in response to excitation by light with a shorter wavelength, a second film comprising a second solid polymer composition, wherein the second solid polymer composition comprises second luminescent crystals, wherein the second luminescent crystals are of the perovskite structure are selected from compounds of formula (II):

$$M^1_aM^2_bX_c \quad \text{(II), wherein}$$

$M^1$ represents Cs, or Cs doped with up to 30 mol % of one or more other metals having coordination number 12, $M^2$ represents Pb, or Pb doped with up to 30 mol % of one or more other metals having coordination number 6, X independently represents anions selected from the group consisting of CI, Br, and I, cyanide, and thiocyanate, a represents 1, b represents 1, c represents 3;

are of size between 3 nm and 3000 nm, emit green light in response to excitation by light with a shorter wavelength, and one or more barrier films each having a water vapor transmission rate of less than 0.2 g mm $m^{-2}$ $day^{-1}$.

2. The luminescent component according to claim 1, wherein the first luminescent crystals are of size between 5 nm and 100 nm.

3. The luminescent component according to claim 1, wherein a thickness of the first film is between 3 μm and 500 μm.

4. The luminescent component according to claim 1, comprising a substrate, wherein the first film is supported by the substrate, and wherein the second film is supported by the substrate.

5. The luminescent component according to claim 1, wherein each barrier film comprises material selected from the group consisting of polyvinylidene chlorides, cyclic olefin copolymers, high-density polyethylene, metal oxides, $SiO_x$, $Si_xN_y$.

6. The luminescent component according to claim 4, wherein the substrate is arranged between the first film and the second film.

7. The luminescent component according to claim 4, wherein one of the first and the second film is arranged between the substrate and the other of the first and the second film.

8. The luminescent component according to claim 4, wherein the first film and the second film are arranged on a common surface of the substrate, wherein the first film and the second film are arranged spaced or adjacent.

9. The luminescent component according to claim 8, comprising multiple first films of the first solid polymer composition, multiple second films of the second solid polymer composition, wherein the multiple first films and the multiple second films are arranged on the common surface of the substrate.

10. The luminescent component according to claim 9, wherein the multiple first films and the multiple second films are arranged alternating on the common surface of the substrate in one of a spaced or an adjacent arrangement.

11. The luminescent component according to claim 1, wherein the first luminescent crystals are selected from the group consisting of $CsPbBr_xI_{3-x}$, where $0 \le x < 2$ $CsPbCl_yBr_{3-y-z}I_z$, where $0 < y < 1$, $2 \le z \le 3-y$.

12. The luminescent component according to claim 1, wherein the first film comprises first luminescent crystals only and is free from second luminescent crystals, wherein the second film comprises second luminescent crystals only and is free from first luminescent crystals.

13. The luminescent component according to claim 4, wherein the substrate is one of an organic substrate or an inorganic substrate and is non-opaque, and wherein each of the first and the second solid polymer compositions comprises a polymer selected from the group of acrylate polymers, carbonate polymers, sulfone polymers, epoxy polymers, vinyl polymers, urethane polymers, ester polymers, styrene polymers, silicone polymers and cyclic olefin copolymers.

14. A light emitting device, comprising a luminescent component according to claim 1, a light source for emitting blue light, the light source being arranged for exciting the luminescent component, and wherein the light emitting device is one of a Liquid Crystal Display (LCD), an Organic Light Emitting Diode (OLED) or a Light Emitting Diode (LED).

15. Use of a luminescent component of claim 1, for emitting white light in response to the luminescent component being radiated by blue light, as a backlight in a Liquid Crystal Display (LCD).

16. The luminescent component according to claim 6, wherein the first film is arranged between a first of the barrier films and the substrate, and the second film is arranged between a second of the barrier films and the substrate.

17. The luminescent component according to claim 7, wherein the first and the second film are arranged between the substrate and the barrier film.

18. The luminescent component according to claim 8, wherein the first film and the second film are arranged between the substrate and the barrier film.

19. The luminescent component according to claim 9, wherein the multiple first films and the multiple second films are arranged between the substrate and the barrier film.

20. The luminescent component according to claim 13, wherein the substrate comprises or consists of a polymer selected from the list of polyethylenterephthalat (PET), Triacetylcellulose (TAC), polyethylene naphthalate (PEN).

21. The luminescent component according to claim 1, wherein the second luminescent crystals are of size between 5 nm and 100 nm.

22. The luminescent component according to claim 1, wherein a thickness of the second film is between 30 μm and 500 μm.

23. The luminescent component according to claim 1, wherein the second luminescent crystals are selected from the group consisting of $CsPbBr_xI_{3-x}$, where $2 \le x \le 3$ $CsPbCl_yBr_zI_{3-y-z}$, where $0<y<1$, $1<z \le 3-y$.

* * * * *